US012531146B2

United States Patent
Wallace et al.

(10) Patent No.: US 12,531,146 B2
(45) Date of Patent: Jan. 20, 2026

(54) METHOD AND SYSTEM FOR TIME SYNCHRONIZATION ACROSS MULTIPLE SURGICAL DATA STREAMS BASED ON EVENT DETECTION IN AN OPERATING ROOM

(71) Applicant: Verb Surgical Inc., Santa Clara, CA (US)

(72) Inventors: David Wallace, Union City, CA (US);
Daniel Ostler-Mildner, Munich (DE);
Salvatore Virga, Munich (DE); Denise Ann Miller, Scotts Valley, CA (US);
Felix Bork, Schnuerpflingen (DE)

(73) Assignee: Verb Surgical Inc., Santa Clara, CA (US)

( * ) Notice: Subject to any disclaimer, the term of this patent is extended or adjusted under 35 U.S.C. 154(b) by 139 days.

(21) Appl. No.: 18/305,295

(22) Filed: Apr. 21, 2023

(65) Prior Publication Data

US 2024/0355455 A1    Oct. 24, 2024

(51) Int. Cl.
*G16H 20/40* (2018.01)
*G10L 25/57* (2013.01)
*G16H 30/40* (2018.01)

(52) U.S. Cl.
CPC ............. *G16H 30/40* (2018.01); *G10L 25/57* (2013.01)

(58) Field of Classification Search
CPC ........ G16H 20/40; G16H 40/20; G16H 15/00; G16H 70/20; G16H 40/63; G16H 40/67
See application file for complete search history.

(56) References Cited

U.S. PATENT DOCUMENTS

| | | | |
|---|---|---|---|
| 10,271,729 B2 | 4/2019 | Greiner et al. | |
| 2017/0178346 A1 | 6/2017 | Ferro et al. | |
| 2017/0249432 A1 | 8/2017 | Grantcharov | |
| 2018/0122506 A1 | 5/2018 | Grantcharov et al. | |
| 2020/0258616 A1* | 8/2020 | Likosky | H04N 21/439 |

(Continued)

FOREIGN PATENT DOCUMENTS

| | | | |
|---|---|---|---|
| CN | 110012391 B | 8/2020 | |
| CN | 107615395 B | 2/2021 | |
| WO | WO-2016149794 A1 * | 9/2016 | ........... A61B 5/0022 |

OTHER PUBLICATIONS

Wisotzky, Eric L., et al. "Interactive and multimodal-based augmented reality for remote assistance using a digital surgical microscope." 2019 IEEE Conference on Virtual Reality and 3D User Interfaces (VR). IEEE, 2019. (Year: 2019).*

(Continued)

*Primary Examiner* — Jason B Dunham
*Assistant Examiner* — Constantine Siozopoulos
(74) *Attorney, Agent, or Firm* — Aikin & Gallant, LLP

(57) ABSTRACT

A method performed by a surgical system. The method includes receiving 1) a video stream captured by a camera inside an operating room and 2) an audio stream that includes sounds captured by a microphone inside the operating room. The method detects an audio event within the operating room by performing an acoustic analysis upon the audio stream. The method produces a timestamp based on the detected audio event and based on an internal clock of the electronic device and tags the timestamp to the video stream and the audio stream. The method stores the tagged image stream and the tagged audio stream in memory.

20 Claims, 7 Drawing Sheets

(56) References Cited

U.S. PATENT DOCUMENTS

2022/0338756 A1   10/2022   Dzhekiev et al.
2023/0386680 A1*  11/2023   Wolf ..................... G16H 30/20

OTHER PUBLICATIONS

Extended European Search Report received for Patent Application No. 24171429.4, mailed on Sep. 17, 2024, 8 pages.

"The Medical Device "Plug-and-Play" Interoperability &Cybersecurity Program. Since 2004 advancing safe and secureinteroperability to improve patient care", MD PnP Getting Connected for patient safety, 2016, 3 pages.

"The standard in secure dynamic networking.", SDC standard, 2021, 5 Pages.

* cited by examiner

METHOD AND SYSTEM FOR TIME SYNCHRONIZATION ACROSS MULTIPLE SURGICAL DATA STREAMS BASED ON EVENT DETECTION IN AN OPERATING ROOM

FIELD

Various aspects of the disclosure relate generally to surgical systems, and more specifically to a surgical system that time synchronizes surgical data streams based on (e.g., audio) event detection. Other aspects are also described.

BACKGROUND

Minimally-invasive surgery, MIS, such as laparoscopic surgery, uses techniques that are intended to reduce tissue damage during a surgical procedure. Laparoscopic procedures typically call for creating a number of small incisions in the patient, e.g., in the abdomen, through which several surgical tools such as an endoscope, a blade, a grasper, and a needle, are then inserted into the patient. A gas is injected into the abdomen which insufflates the abdomen thereby providing more space around the tips of the tools, making it easier for the surgeon to see (via the endoscope) and manipulate tissue at the surgical site. MIS can be performed faster and with less surgeon fatigue using a surgical robotic system in which the surgical tools are operatively attached to the distal ends of robotic arms, and a control system actuates the arm and its attached tool. The tip of the tool will mimic the position and orientation movements of a handheld user input device (UID) as the latter is being manipulated by the surgeon. The surgical robotic system may have multiple surgical arms, one or more of which has an attached endoscope and others have attached surgical instruments for performing certain surgical actions.

Control inputs from a user (e.g., surgeon or other operator) are captured via one or more user input devices and then translated into control of the robotic system. For example, in response to user commands, a tool drive having one or more motors may actuate one or more degrees of freedom of a surgical tool when the surgical tool is positioned at the surgical site in the patient.

SUMMARY

In an operating room, a surgical system may include surgical (medical) electronic devices that are communicating with each other. For example, the surgical system may include an electronic device that operates as a hub, which receives surgical data from one or more surgical devices (e.g., a camera, a sensor, etc.) and displays (at least some of) the data on a user's display. For instance, in the case of a camera (e.g., endoscope), the hub may receive a video stream captured by the camera and route the video stream to one or more devices in order to provide the user with a view of a surgical site. The hub may also allow the user (e.g., through the use of a handheld UID) to control a surgical robot (e.g., a robotic arm) during a laparoscopic surgical procedure. Some of these devices, such as cameras and sensors, may maintain their own internal clocks, which they use to produce (e.g., timestamp) surgical data. As a result, surgical data streams that are received by the hub may not be time synchronized, since the surgical devices may not share a common clock. Therefore, there is a need for time-synchronizing surgical data streams that are produced by (and received from) one or more surgical devices.

The present disclosure provides a surgical system that time-synchronizes multiple surgical data streams based on event detection in an operating room. For example, the system may synchronize data streams based on a detection of an audio event within an operating room. In particular, during a surgical procedure conducted within an operating room, many surgical devices within the room may emit sounds, such as sounds that indicate a status of the device (e.g., beeps of a heart monitor) and/or warning sounds. An identification of these sounds may be utilized by the surgical system to synchronize data streams. For instance, the system may receive 1) a video stream captured by a camera inside the operating room and 2) an audio stream that includes sounds captured by a microphone inside the operating room. The system detects an audio event within the operating room by performing an acoustic analysis upon the audio stream. The system produces a timestamp based on the detected audio event and based on an internal clock of the electronic device. For example, the timestamp may indicate a moment in time along the internal clock at which (e.g., spectral content of) the audio event within the audio stream is received by the electronic device. The system tags the timestamp to the video stream and the audio stream and then stores the tagged image stream and the tagged audio stream in memory. As a result, the system may account for time offsets between internal clocks of different surgical devices that are providing surgical data streams by marking (tagging) each of the streams with a common timepoint.

In one aspect, performing the acoustic analysis includes producing a spectrogram that represents frequency content of at least a portion of the audio stream; and using the spectrogram to detect the audio event. In another aspect, the portion is a first portion of the audio stream, wherein the audio event is a first audio event, and the spectrogram is a first spectrogram, wherein the system further produces a second spectrogram of a second portion of the audio stream to detect a second audio event; determines a first confidence score for the first audio event and a second confidence score for the second audio event; and uses the first audio event to produce the timestamp instead of the second audio event based on the first confidence score being greater than the second confidence score.

In one aspect, detecting the audio event comprises performing a table lookup into a data structure that associates each of one or more spectrograms with a respective predefined audio event. In another aspect, detecting the audio event comprises receiving a machine learning (ML) model trained using training data that associates audio events that occur within the operating room with respective spectrograms; and receiving the audio event as output from the ML model responsive to using the spectrogram as input into the ML model. In some aspects, the detected audio event is either 1) a predefined sound produced by a piece of electronics within the operating room or 2) an ambient sound that is present within the operating room.

Another aspect of the disclosure provides a method that includes receiving, during a surgical procedure, several data streams from several devices of a surgical system within an operating room in which the surgical procedure is being performed, where the data streams includes an audio stream. The method detects an audio event that has occurred during the surgical procedure by performing an acoustic analysis upon the audio stream. The method time synchronizes the data streams based on the detected audio event and stores the time synchronized data streams in memory.

In one aspect, the audio stream is received from a microphone of the surgical system that is arranged within the operating room, and time synchronizing the data streams includes: determining a time at which the microphone captured the audio event based on the acoustic analysis of the audio stream; producing a timestamp based on the determined time; adding the timestamp to each of the data streams such that a portion of each of the data streams is time-aligned with a portion of the audio stream associated with the determined time.

In another aspect, performing the acoustic analysis includes producing a spectrogram that represents frequency content of at least a portion of the audio stream, and using the spectrogram to detect the audio event. In some aspects, the portion is a first portion of the audio stream, the audio event is a first audio event, and the spectrogram is a first spectrogram, where the method further includes: producing a second spectrogram of a second portion of the audio stream to detect a second audio event; determining a first confidence score for the first audio event and a second confidence score for the second audio event; and using the first audio event to produce the timestamp instead of the second audio event based on the first confidence score being greater than the second confidence score. In one aspect, detecting the audio event includes performing a table lookup into a data structure that associates each of one or more spectrograms with a respective predefined audio event. In another aspect, detecting the audio event includes: receiving a machine learning (ML) model trained using training data that associates audio events that occur within the operating room with respective spectrograms; and receiving the audio event as output from the ML model responsive to using the spectrogram as input into the ML model. In some aspects, the detected audio event is either 1) a predefined sound produced by a piece of electronics within the operating room or 2) an ambient sound that is present within the operating room.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
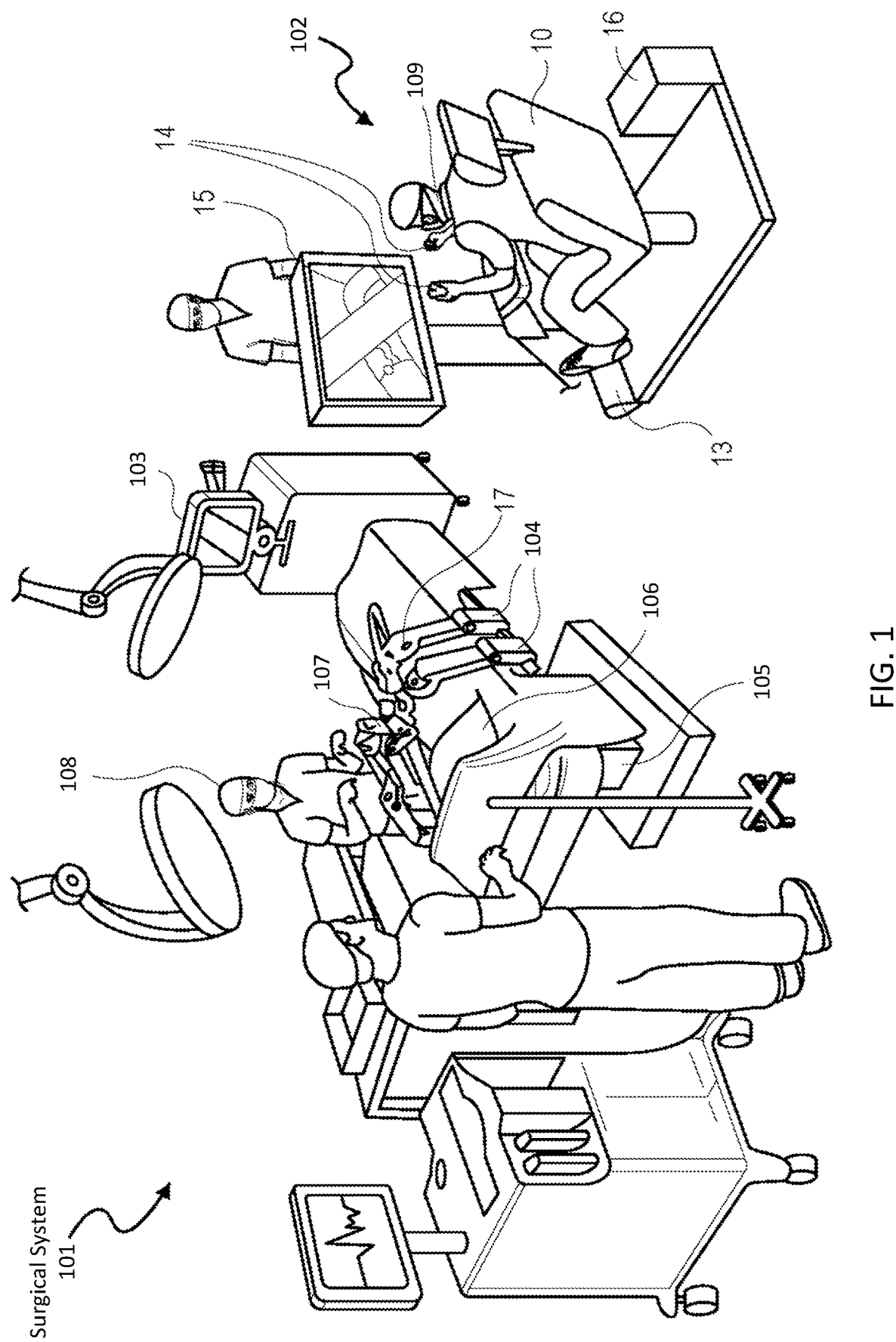
FIG. 1 shows a pictorial view of an example surgical system in an operating arena.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Event detection for (e.g., during and/or after) a surgical procedure and surgical workflow and process analysis may be supported through data analysis of surgical devices that are used within an operating room during the procedure. To collect device information, however, direct dedicated interfaces (e.g., Internet Protocol (IP)-based, serial connection, etc.) may be required. Establishing and obtaining access to such interfaces and communication protocols for (e.g., third-party) surgical devices to receive information may be difficult or even impossible. To solve this problem, the present disclosure provides a surgical system that is capable of detecting events during (and/or after) a procedure. For example, the system may use acoustic analysis of sounds captured within an operating room to obtain relevant device data from one or more surgical devices, independent of interfaces and the manufacturer of the devices. Examples for such device information include, but is not limited to activations from energy devices (e.g., cutting, coagulation, etc.), vital signs (e.g., acoustic and/or visual) derived through an anesthesia workstation (e.g., heartrate, ventilation frequency, etc.), surgical table movements, characteristic sounds of surgical robots (e.g., during docking of instruments or adjustments of robotic arms of the robots, etc.), etc.

Such event detection may be used to optimize surgical data received during the surgical procedure and/or improve surgical performance (e.g., of surgical robots being used during (or after) the procedure). For example, the surgical system of the present disclosure may utilize event detection to time-synchronize data streams received from several different surgical (medical) devices, where each of the devices may utilize its own (different) internal clock. As another example, event detection may be used to verify whether received information of a surgical device matches its acoustic output. For example, a heart monitor may provide the surgical system (e.g., through a wired connection) a heartrate. At the same time, the monitor may produce audible beeps, where each beep represents a heart movement. The surgical system may use acoustic event detection to detect a beep, and once detected may compare the acoustic event to heart monitor surgical data to confirm that the beep corresponds to its received data. More about using event detections to improve surgical performance is described herein.

FIG. 1 shows a pictorial view of an example (e.g., laparoscopic) surgical system (which hereafter may be referred to as "system") 101 in an operating arena. The system 101 includes a user console 102, a control tower 103 (or hub), and one or more surgical robotic arms 104 at a surgical robotic table (surgical table or surgical platform) 105. In one aspect, the arms 104 may be mounted to a table or bed on which the patient rests as shown in the example of FIG. 1. In one aspect, at least some of the arms 104 may be configured differently. For example, at least some of the arms may be mounted on a ceiling, sidewall, or in another suitable structural support, such as a cart separate from the table. The system 101 can incorporate any number of devices, tools, or accessories used to perform surgery on a patient 106. For example, the system 101 may include one or more surgical tools (instruments) 107 used to perform surgery (surgical procedure). A surgical tool 107 may be an end effector that is attached to a distal end of a surgical arm 104, for executing a surgical procedure.

Each surgical tool 107 may be manipulated manually, robotically, or both, during the surgery. For example, the surgical tool 107 may be a tool used to enter, view, perform a surgical task, and/or manipulate an internal anatomy of the patient 106. In an aspect, the surgical tool 107 is a grasper that can grasp tissue of the patient. The surgical tool 107 may be controlled manually, by a bedside operator 8; or it may be controlled robotically, via actuated movement of the surgical robotic arm 104 to which it is attached. For example, when manually controlled an operator may (e.g., physically) hold a portion of the tool (e.g., a handle), and may manually control the tool by moving the handle and/or pressing one or more input controls (e.g., buttons) on the (e.g., handle of the) tool. In another aspect, when controlled robotically, the surgical system may manipulate the surgical tool based user input (e.g., received via the user console 102, as described herein).

Generally, a remote operator 109, such as a surgeon or other operator, may use the user console 102 to remotely manipulate the arms 104 and/or the attached surgical tools 107, e.g., during a teleoperation. The user console 102 may be located in the same operating room as the rest of the system 101, as shown in FIG. 1. In other environments, however, the user console 102 may be located in an adjacent or nearby room, or it may be at a remote location, e.g., in a different building, city, or country. The user console 102 may include one or more components, such as a seat 10, one or more foot-operated controls (or foot pedals) 13, one or more (handheld) user-input devices (UIDs) 14, and at least one display 15. The display is configured to display, for example, a view of the surgical site inside the patient 106. The display may be configured to display image data (e.g., still images and/or video). In one aspect, the display may be any type of display, such as a liquid crystal display (LCD), a light-emitting diode (LED) display, an organic LED (OLED) display, a head-mounted display (HMD), etc. In some aspects, the display may be a 3D immersive display that is for displaying 3D (surgical) presentations. For instance, during a surgical procedure one or more endoscopes (e.g., endoscopic cameras) may be capturing image data of a surgical site, which the display presents to the user in 3D. In one aspect, the 3D display may be an autostereoscopic display that provides 3D perception to the user without the need for special glasses. As another example, the 3D display may be a stereoscopic display that provides 3D perception with the use of glasses (e.g., via active shutter or polarized).

In another aspect, the display 15 may be configured to display at last one graphical user interface (GUI) that may provide informative and/or interactive content, to thereby assist a user in performing a surgical procedure with one or more instruments in the surgical system 101. For example, some of the content displayed may include image data captured by one or more endoscopic cameras, as described herein. In another aspect, the GUI may include selectable UI items, which when manipulated by the user may cause the system to perform one or more operations. For instance, the GUI may include a UI item as interactive content to switch control between robotic arms. In one aspect, to interact with the GUI, the system may include input devices, such as a keyboard, a mouse, etc. In another aspect, the user may interact with the GUI using the UID 14. For instance, the user may manipulate the UID to navigate through the GUI, (e.g., with a cursor), and to make a selection may hover the cursor over a UI item and manipulate the UID (e.g., selecting a control or button). In some aspects, the display may be a touch-sensitive display screen. In this case, the user may perform a selection by navigating and selecting through touching the display. In some aspects, any method may be used to navigate and/or select a UI item.

As shown, the remote operator 109 is sitting in the seat 10 and viewing the user display 15 while manipulating a foot-operated control 13 and a handheld UID 14 in order to remotely control one or more of the arms 104 and the surgical tools 107 (that are mounted on the distal ends of the arms 104.)

In some variations, the bedside operator 108 may also operate the system 101 in an "over the bed" mode, in which the beside operator (user) is now at a side of the patient 106 and is simultaneously manipulating a robotically-driven tool (end effector as attached to the arm 4), e.g., with a handheld UID 14 held in one hand, and a manual laparoscopic tool. For example, the bedside operator's left hand may be manipulating the handheld UID to control a robotic component, while the bedside operator's right hand may be manipulating a manual laparoscopic tool. Thus, in these variations, the bedside operator may perform both robotic-assisted minimally invasive surgery and manual laparoscopic surgery on the patient 106.

During an example procedure (surgery), the patient 106 is prepped and draped in a sterile fashion to achieve anesthesia. Initial access to the surgical site may be performed manually while the arms of the system 101 are in a stowed configuration or withdrawn configuration (to facilitate access to the surgical site.) Once access is completed, initial positioning or preparation of the system 101 including its arms 104 may be performed. Next, the surgery proceeds with the remote operator 109 at the user console 102 utilizing the foot-operated controls 13 and the UIDs 14 to manipulate the various end effectors and perhaps an imaging system, to perform the surgery. Manual assistance may also be provided at the procedure bed or table, by sterile-gowned bedside personnel, e.g., the bedside operator 108 who may perform tasks such as retracting tissues, performing manual repositioning, and tool exchange upon one or more of the robotic arms 104. Non-sterile personnel may also be present to assist the remote operator 109 at the user console 102. When the procedure or surgery is completed, the system 101 and the user console 102 may be configured or set in a state to facilitate post-operative procedures such as cleaning or sterilization and healthcare record entry or printout via the user console 102.

In one aspect, the remote operator 109 holds and moves the UID 14 to provide an input command to drive (move) one or more robotic arm actuators 17 (or driving mechanism) in the system 101 for teleoperation. The UID 14 may be communicatively coupled to the rest of the system 101, e.g., via a console computer system 16 (or host). The UID 14 can generate spatial state signals corresponding to movement of the UID 14, e.g., position and orientation of the handheld housing of the UID, and the spatial state signals may be input signals to control motions of the robotic arm actuators 17. The system 101 may use control signals derived from the spatial state signals, to control proportional motion of the actuators 17. In one aspect, a console processor of the console computer system 16 receives the spatial state signals and generates the corresponding control signals. Based on these control signals, which control how the actuators 17 are energized to drive a segment or link of the arm 104, the movement of a corresponding surgical tool that is attached to the arm may mimic the movement of the UID 14. Similarly, interaction between the remote operator 109 and the UID 14 can generate, for example, a grip control signal that causes a jaw of a grasper of the surgical tool 107 to close and grip the tissue of patient 106.

The system 101 may include several UIDs 14, where respective control signals are generated for each UID that control the actuators and the surgical tool (end effector) of a respective arm 104. For example, the remote operator 109 may move a first UID 14 to control the motion of an actuator 17 that is in a left robotic arm, where the actuator responds by moving linkages, gears, etc., in that arm 104. Similarly, movement of a second UID 14 by the remote operator 109 controls the motion of another actuator 17, which in turn drives other linkages, gears, etc., of the system 101. The system 101 may include a right arm 104 that is secured to the bed or table to the right side of the patient, and a left arm 104 that is at the left side of the patient. An actuator 17 may include one or more motors that are controlled so that they drive the rotation of a joint of the arm 104, to for example change, relative to the patient, an orientation of an endoscope or a grasper of the surgical tool 107 that is attached to that arm. Motion of several actuators 17 in the same arm 104 can be controlled by the spatial state signals generated from a particular UID 14. The UIDs 14 can also control motion of respective surgical tool graspers. For example, each UID 14 can generate a respective grip signal to control motion of an actuator, e.g., a linear actuator that opens or closes jaws of the grasper at a distal end of surgical tool 107 to grip tissue within patient 106.

In some aspects, the communication between the surgical robotic table 105 and the user console 102 may be through a control tower 103, which may translate user commands that are received from the user console 102 (and more particularly from the console computer system 16) into robotic control commands that transmitted to the arms 104 on the surgical table 105. The control tower 103 may also transmit status and feedback from the surgical table 105 back to the user console 102. The communication connections between the surgical table 5, the user console 102, and the control tower 103 may be via wired (e.g., optical fiber) and/or wireless links, using any suitable one of a variety of wireless data communication protocols, such as BLUETOOTH protocol. Any wired connections may be optionally built into the floor and/or walls or ceiling of the operating room. The system 101 may provide video output to one or more displays, including displays within the operating room as well as remote displays that are accessible via the Internet or other networks. The video output or feed may also be encrypted to ensure privacy and all or portions of the video output may be saved to a server or electronic healthcare record system.

Figure 2:
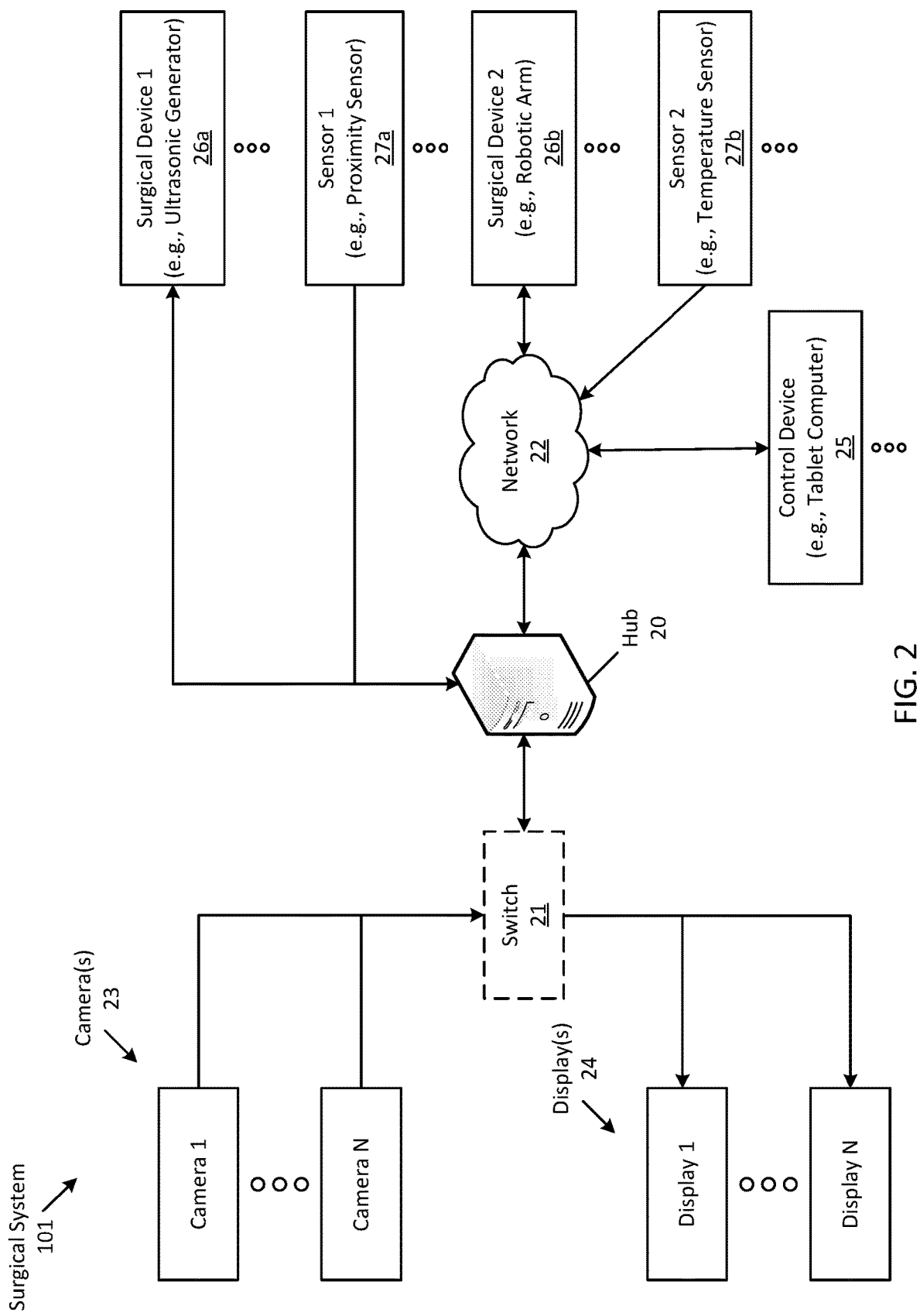
FIG. 2 is a block diagram of the surgical system in which a hub of the system communicates with several devices according to one aspect.

FIG. 2 is a block diagram of the surgical system 101 in which a hub (or hub device) 20 of the system communicates with several devices according to one aspect. In some aspects, the hub 20 may be (include or be a part of) the control tower 103, or may be (e.g., a device separate from the control tower 103 and) configured to perform at least some of the operations of the control tower 103 as described herein, such as receiving user commands from a user device (e.g., UID 14) and translating the commands into robotic control commands to be routed to one or more devices of the surgical system. In addition, the hub 20 may be configured to receive surgical data streams from one or more surgical devices (and/or sensors) and produce (and/or pass through) one or more video streams (which include surgical data from at least some of the received surgical data streams, for example) for display on one or more displays. More about the operations of the hub 20 is described herein.

As shown, the surgical system 101 includes the hub 20, a (optional) switch 21, a network 22, one or more cameras 23, one or more display (screens) 24, a (first) surgical device (e.g., an ultrasonic generator) 26a, a (second) surgical device (e.g., a robotic arm) 26b, a (first) sensor (e.g., a proximity sensor) 27a, a (second) sensor (e.g., a temperature sensor) 27b, and a control device 25. In one aspect, the system may include fewer or more components. For instance, the system may include one or more sensors (and/or one or more surgical devices), and/or may include more than one control device. In one aspect, at least some of these elements may be arranged (disposed) within an operating room, such that they are configured to communicate (e.g., with one another) during a surgical procedure that is conducted within the operating room.

The hub 20 may be any type of electronic device that is able to communicate with one or more other devices in order to exchange data, and to produce (and/or pass through) one or more video streams, each video stream having at least some data received from one or more of the other devices, for display on one or more displays 24. In one aspect, the hub 20 may include electronic components (e.g., one or more processors, memory, etc.) for conducting at least some of the operations described herein. For example, the hub 20 may be a desktop computer, a laptop computer, etc. In another aspect, the hub 20 may be one or more (remote or cloud-based) servers. In some aspects, the hub 20 may be a handheld electronic device, such as a tablet computer or a smartphone.

Each of the surgical devices 26a and 26b may be any type of surgical device that is configured to perform (e.g., automatically, without user intervention, and/or through manual (or user) manipulation) one or more surgical tasks and/or to produce at least one surgical data stream (which may include data/information related to its associated surgical task(s)). For instance, the first surgical device 26a may be an energy (or ultrasonic) generator which may be configured to operate an ultrasonic tool for use during a procedure (e.g., in order to cut and cauterize tissue). In one aspect, the surgical data stream produced by the first device may include data related to the ultrasonic tool, such as its operating state (whether the tool is actively cutting tissue), and/or parameters associated with the ultrasonic instrument, such as a resonant frequency. The second surgical device 26b may be a robotic arm, such as arm 104 shown in FIG. 1. In one aspect, the second surgical device 26b may provide surgical data that indicates its orientation (pose) within the operating room.

Each of the sensors 27a and 27b may be any type of electronic device that is configured to detect (or sense) the environment (e.g., an operating room) and produce sensor data (e.g., as one or more surgical data streams) based on the environment. For example, the first sensor 27a may be a proximity sensor that produces sensor data that indicates a position of one or more objects with respect to the sensor. The second sensor 27b may be a temperature sensor that detects an ambient temperature (e.g., within the operating room). In another aspect, the surgical system may include other sensors, such as a microphone that is arranged to capture sounds within the ambient environment (e.g., operating room) and produce one or more audio streams (e.g., having digital audio data) that include the captured sounds (e.g., as one or more audio frames). In one aspect, the sensors and surgical devices may each be separate electronic devices (with respect to one another). In another aspect, at least some of the sensors may be a part of (e.g., housed within) one or more of the surgical devices (and/or other electronic devices that are capable of being communicatively coupled with the hub 20). For example, the proximity sensor 27a may be a part of the robotic arm 26b, and may allow the system to determine the position of the arm with respect to other objects (e.g., in order to avoid collisions).

The control device 25 may be any type of electronic device that is configured to interact with one or more other electronic devices of the surgical system 101. For example, the control device may be a handheld UID allows a user to interact with the surgical system (e.g., manipulating the robotic arm 26b). In another aspect, the control device 25 may be any type of computing device, such as a tablet computer that is arranged to provide control commands to the surgical system and receive surgical data for presentation (e.g., display on a touch-sensitive display screen) on the device 25.

In one aspect, the hub 20 may be able to communicatively couple to the surgical devices/sensors and/or the control device through various methods. For example, as shown, the hub 20 is communicatively coupled (e.g., establishing a communication connection) with the second surgical device 26b, the second sensor 27b, and the control device 25, via a network 22, in order to exchange data. In one aspect, devices may communicate via any (computer) network, such as a wide area network (WAN) (e.g., the Internet), a local area network (LAN), etc., through which the devices may exchange data between one another and/or may exchange data with one or more other electronic devices, such as a remote electronic server. In another aspect, the network may be a wireless network such as a wirelessly local area network (WLAN), a cellular network, etc., in order to exchange digital data. With respect to the cellular network, the hub (e.g., via a network interface) may be configured to establish a wireless (e.g., cellular) call, in which the cellular network may include one or more cell towers, which may be part of a communication network (e.g., a 4G Long Term Evolution (LTE) network) that supports data transmission (and/or voice calls) for electronic devices, such as mobile devices (e.g., smartphones). In another aspect, the devices may be configured to wirelessly exchange data via other networks, such as a Wireless Personal Area Network (WPAN) connection. For instance, the hub 20 may be configured to establish a wireless communication link (connection) with an element (e.g., the second surgical device 26b) via a wireless communication protocol (e.g., BLUETOOTH protocol or any other wireless communication protocol). During the established wireless connection, the electronic device may transmit data, such as sensor data as data packets (e.g., Internet Protocol (IP) packets) to the hub 20.

In another aspect, the hub 20 may be communicatively coupled via a wired connection, such as to the first surgical device 26a and the first sensor 27a. For example, the hub 20 may be connected to either of the devices through any type of wired connection, such as a fiber optic cable, an Ethernet cable, High-Definition Multimedia Interface (HDMI) cable, Digital Video Interface (DVI), Serial Digital Interface (SDI), etc. In some aspects, the hub device 20 may communicate with any of the devices using any type of communication protocol (e.g., Transmission Control Protocol (TCP), Hypertext Transfer Protocol (HTTP), File Transfer Protocol (FTP), Data Distribution Service (DDS). In one aspect, the hub may communicate with one or more devices via an Application Programming Interface (API). For example, to communicate with the second surgical device 26b, via the Internet (through the network 22), the hub 20 may use Representational State Transfer (RESTful) APIs to exchange surgical data.

Each of the cameras 23 may be any type of camera (e.g., a complementary metal-oxide-semiconductor (CMOS) image sensor) that is configured to capture video (and/or image) data as a video stream (e.g., that includes a series of still images, each image showing a scene within a field of view of the camera). In one aspect, the camera may be an endoscope that is designed to capture video of a surgical site within a body of a patient during a surgical procedure. In one aspect, the camera may be a monocular camera that (e.g., has a single camera sensor that) captures one digital image (e.g., a still image) at a time (e.g., to produce an endoscopic video stream). In another aspect, the camera may be a stereoscopic (stereo) camera with two (or more) lenses, each with a separate camera sensor for capturing individual still images (e.g., for producing separate video streams) in order to create 3D video. In one aspect, the camera may be a stand-alone camera (e.g., an electronic device with a primary function of capturing video data). In another aspect, the camera may be a part of an electronic device, such as a smartphone. In which case, the smartphone may be communicatively coupled (e.g., via a wireless network, such as a BLUETOOTH network), in order to transmit a captured video stream to the controller 30. In some aspects, video stream(s) received from the camera(s) 23 and/or the video stream(s) produced by the hub 20 may be high definition (HD) video that may include 10-bit 4K video such as, for example, of resolution 3840×2160 pixels (which is also referred to as 2160p), 1920×1080 pixels (also referred to as 1080p video), and 1280×720 pixels (also referred to as 720p video) with a frame rate of 59.94 and/or 60 image frames per second (fps).

The switch 21 is coupled to each of the cameras 23 to receive one or more video (and/or audio) streams produced by each camera, and is coupled to the hub 20 to receive one or more video (and/or audio) streams produced by the hub 20 (e.g., each stream having surgical data, as described herein). In one aspect, the switch may pass through one or more video streams produced by the cameras 23 to the hub 20. The switch is also coupled to the displays 24, and is configured to pass through one or more video streams from one or more cameras 23 and/or the hub 20 to one or more of the displays for display. In one aspect, the switch 21 may include one or more input devices (e.g., a physical button), which allow a user to manually define which streams pass through (into and/or out of) the switch 21. In another aspect, the switch 21 may be configured by an electronic device, such as the hub 20 to pass through one or more streams based on control signals received from the hub 20. In one aspect, the switch may be an optional device. In which case, the camera(s) and the display(s) may be coupled (e.g., wired and/or wirelessly) to the hub, which may be configured to receive video data from the cameras and then produce one or more video streams (which may at least partially include the video data captured by the cameras) for display on the displays 24.

In one aspect, the operations performed by the surgical system may be in real-time (e.g., during a surgical procedure). In which case, the hub 20 may exchange surgical data with one or more surgical devices, sensors, and/or control devices during a procedure. For example, the hub 20 may receive control signals from the control device 25 to manipulate the robotic arm 26b. As another example, the hub 20 may be configured to produce one or more video streams which may be presented on one or more displays 24. In another aspect, the hub 20 may present surgical data as being overlaid on top of (or superimposed above) video data captured by one or more cameras 23. For example, the hub 20 may receive video streams from the cameras 23 and surgical data produced by a surgical device and/or sensor. The hub 20 may superimpose above (overlay on top of) a video stream from a camera at least a portion of the surgical data (e.g., temperature readings from the temperature sensor 27b). In one aspect, to superimpose surgical data, the hub 20 may alpha blend (e.g., portions) of surgical data to a video stream. The alpha blended video stream may then be displayed on a display 24 to provide a user with a of a camera 23 along with desired surgical information (e.g., in real-time). In another aspect, the hub 20 may receive video streams and/or surgical data streams, and store the data (e.g., in local and/or remote storage locations) for later viewing.

As described herein, each of the devices (e.g., cameras 23, surgical devices 26a and 26b, sensors 27a and 27b, and/or control device 25) may produce one or more surgical data streams using their own individual system (internal) clocks. In which case, data received by the hub 20 from various devices may not be time synchronized accurately. Unsynchronized surgical data may result in the hub device 20 combining data inaccurately. For example, when the sensor 27a is a microphone, an audio stream produced by the microphone may have a time offset with respect to a video stream produced by a camera 23. As a result, when the audio stream is combined with the video stream, the audio may lag (or lead) the video, which is undesirable. Therefore, the surgical system 101 of the present disclosure is configured to time-synchronize surgical data streams received from the devices of the surgical system based on event detection. More about the operations performed by the surgical system is described herein.

Figure 3:
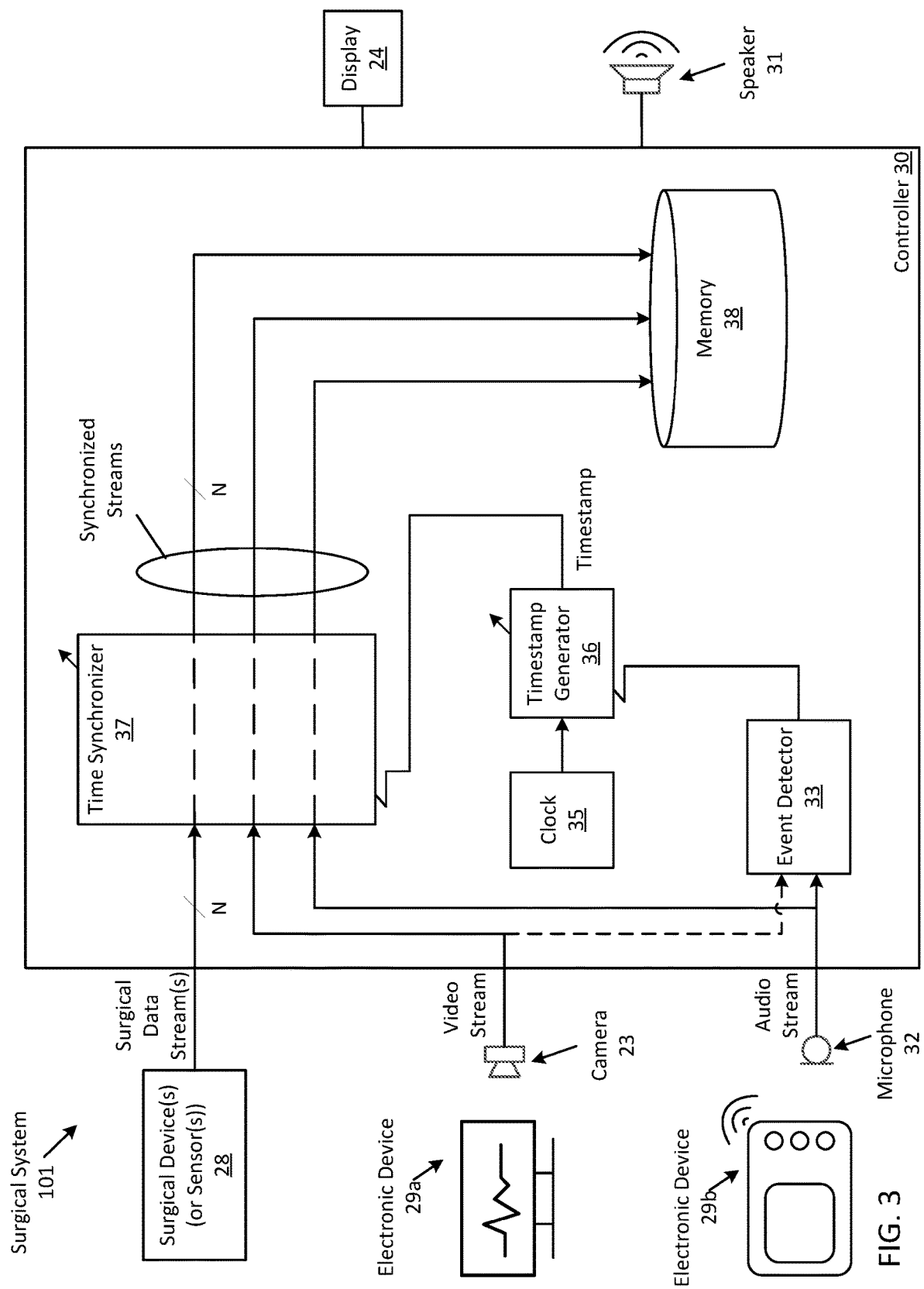
FIG. 3 is a block diagram of the surgical system that time synchronizes surgical data streams received from several devices based on event detection according to one aspect.

FIG. 3 is a block diagram of the surgical system 101 that time synchronizes surgical data streams received from several devices based on event detection according to one aspect. The system includes one or more (e.g., electrical) components (or elements), such as the display 24, a speaker 31, a microphone 32, the camera 23, one or more surgical devices (and/or sensors), and a controller 30. In one aspect, the surgical device(s) (or sensor(s)) 28 may include one or more surgical devices and/or sensors, as described herein (e.g., devices 26a and 26b and/or sensors 27a and 27b). The system also includes two electronic devices 29a and 29b. In one aspect, at least one of the electronic devices 29a and 29b may be a part of the surgical system (e.g., device 29a being one of the displays 24). In another aspect, at least one of the electronic devices 29a and 29b may be a device that is separate from the surgical system. In particular, this separate device may not be communicatively coupled (e.g., via a wired and/or wireless connection) with one or more devices (e.g., the hub 20) of the system. In another aspect, the electronic devices 29a and 29b may be from different third-party manufacturers. In some aspects, the system may include fewer or more devices, such as having only one electronic device 29a or having many (e.g., "N") surgical devices 28. In another aspect, the system 101 shown in this figure may include other elements that are not shown, such as having a control device 25.

The controller 30 may be any type of electronic component that is configurable to perform one or more computational operations. For example, the controller may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller 30 is configured to perform time synchronization operations upon one or more surgical data streams based on event detection, as described herein. In one aspect, the controller 30 may be a part of an electronic device, such as the hub 20 of FIG. 2 (and/or the control tower 103 of FIG. 1).

The controller 30 is configured to receive one or more surgical data streams produced by one or more (e.g., surgical) devices (and/or sensors). For example, the controller is configured to receive (at least one) audio stream produced by the microphone 32, where the audio stream may include one or more (ambient) sounds captured by the microphone 32 from within the operating room. The controller may also be configured to receive (at least one) video stream produced by the camera 23 (e.g., inside an operating room, such as an endoscope, or a camera that is arranged to have a field of view of at least a portion of the operating room). In another aspect, the controller may be configured to receive one or more surgical data streams (N data streams) from one or more surgical devices and/or sensors 28. In one aspect, the controller may receive at least some of the data streams in real-time (e.g., receiving the video stream from the camera 23 as the camera is being used to perform an endoscopic surgical procedure). In another aspect, the controller may receive at least some of the surgical data streams from memory (e.g., memory 38) of the surgical system. Thus, at least some of the operations performed by the controller may be performed in real-time and/or performed "off-line", meaning after the data streams were produced by their respective electronic devices and stored in memory. In which case, the surgical system may be configured to receive the one or more surgical data streams (e.g., from memory and/or from one or more devices), and store the streams in (e.g., local) memory. The (e.g., controller 30 of the) surgical system may be configured to perform at least some of the operations described herein upon at least some of the (locally) stored data streams (e.g., to time-synchronize the data streams). In another aspect, one or more of the surgical data streams may be received from a remote memory device, such as a remote server that is communicatively coupled (e.g., via the internet) to the controller 30.

The controller 30 includes several operational blocks that enable the controller to time-synchronize at least some data streams, as described herein. For example, the controller includes an event detector 33, a (e.g., internal) clock 35, a timestamp generator 36, and a time synchronizer 37. The controller 30 also includes memory 38. Examples of memory (e.g., non-transitory machine-readable storage medium) may include read-only memory, random-access memory, CD-ROMs, DVDs, magnetic tape, optical data storage devices, flash memory devices, and phase change memory. In one aspect, the memory may be a part of the controller. In another aspect, the memory may be separate from the controller (e.g., a part of another electronic device). In which case, the controller may be configured to communicate with the memory in order to perform operations, such as a read operation and a write operation.

As described herein, the controller 30 may be configured to time-synchronize surgical data streams based on event detection. In one aspect, the controller may perform synchronization operations responsive to detecting audio (or acoustic) events, which may occur within an operating room during a surgical procedure. In particular, the event detector 33 may be configured to receive one or more audio streams produced by the microphone 32, each of which may include ambient sounds captured within an ambient environment (e.g., the operating room), in which the microphone is located, and may be configured to detect an audio event (e.g., that occurs within the operating room) by performing an acoustic analysis upon the audio stream.

In one aspect, an audio event may be an occurrence in which an electronic device within the operating room produces one or more sounds. For example, as shown in this figure, the electronic device 29b may be a surgical monitor that is producing a sound through one or more (e.g., built-in) speakers (shown by waved lines being emitted from the device), such as a beep or a non-verbal sound. As another example, when the electronic device 29b is a heart monitor, the sound produced by the machine may be a reproduction of a patient's heartbeat. In another aspect, an audio event may be a non-speaker (e.g., mechanical) sound produced by a device within the room. In particular, the sound may be a (e.g., pre-defined or pre-known) sound produced by a piece of electronics within the operating room. For example, an audio event may be a sound of an actuator of a robotic arm actuating to move the robotic arm from one pose to another. As another example, a mechanical sound may be a sound of an ultrasonic instrument vibrating while in use by a surgeon. As yet another example, the sound may be a ticking sound of an analog clock that is hanging on an operating room's wall. In another aspect, the audio event may be a naturally occurring sound that occurs within the operating room. In particular, the sound may be an ambient sound that is present (or is known to be present) within an operating room. Examples of naturally occurring sounds may include sounds of movements, such as a sound of a door opening or closing, a sound of a gurney's wheels moving while the gurney is being moved about the operating room, a sound of a person walking or shuffling about, etc. Other naturally occurring sounds may include background (or ambient) sounds, such as a sound of traffic or a train passing by. In another aspect, an audio event may be any type of sound that may be captured by the microphone 32, contained within one or more audio streams produced by the microphone.

As described herein, the event detector 33 may be configured to detect an audio event by performing an acoustic analysis upon a received audio stream (e.g., produced by microphone 32). For example, the detector may be configured to compare at least a portion of the audio stream (or signal) with one or more predefined signals, each predefined signal associated with a particular audio event. In one embodiment, the predefined signals may be retrieved by the event detector from memory 38. In particular, each predefined signal may be different for each audio event, and thus, upon the received audio signal (at least partially) matching a predefined signal (e.g., up to at least a threshold), the event detector may select the associated audio event associated with the predefined signal.

In another aspect, the event detector may detect an audio event based on one or more spectrograms. For example, the event detector may transform one or more sounds contained within the audio stream into one or more spectrograms. In particular, the detector may produce (or generate) one or more spectrograms based on the audio stream, each of which represents one or more sounds from (at least a portion of) the stream as frequency content, in the frequency domain (e.g., which may be a function of time). In one aspect, to produce a spectrogram, the detector may perform a split sliding window (e.g., Fast Fourier Transform (FFT) spectral analysis) function, in which the detector performs the spectral analysis upon one or more audio (digital) samples (e.g., the number of samples being defined based on a window size) to produce a spectrogram of the samples. In one aspect, each spectrogram may spectrally represent the audio stream across one or more slices (or samples). In some aspects, a spectrogram may indicate a magnitude (e.g., a numerical value) of each frequency bin across one or more frequency bins. In some aspects, the spectrogram may be a Mel-frequency cepstrum, which is represented by one or more Mel-frequency cepstral coefficients (MFCCs).

In one aspect, the event detector may use one or more produced spectrograms associated with the audio stream to detect an audio event. In particular, the event detector 33 may apply one or more produced spectrograms (e.g., as input) into a (e.g., predefined) model, which may indicate an audio event (or more specifically an identification of a captured sound that represents an audio event) associated with the one or more spectrograms (as output). For example, the event detector may perform a table lookup into a data structure (e.g., stored in memory 38) that associates each of one or more spectrograms with an identification of (e.g., one or more sounds of) a respective (predefined) audio event. Upon identifying a matching (or at least partially matching, up to a threshold value) spectrogram in the data structure, the event detector identifies an audio event (represented by the produced spectrogram) associated with the matching spectrogram. In another aspect, the model may be an acoustic model that was produced in a controlled environment (e.g., a laboratory).

In another aspect, the event detector 33 may detect the audio event by applying at least a portion of the audio stream (e.g., one or more representative spectrograms) as input into a machine learning (ML) model, which produce an identification of the audio event associated with the spectrograms as output. In some aspects, the event detector may receive a ML model trained using training data that associates audio events that occur (e.g., within an operating room) with respective spectrograms. In particular, the ML model may be a (e.g., pre-trained) deep neural network (e.g., a convolution neural network) which uses one or more spectrograms as input (e.g., where the spectrogram matches an input size of the network), and classifies one or more sounds represented by the input spectrogram(s) as one or more audio events (as output). In another aspect, the ML model may be any type of pre-trained model for identifying audio events, such as a (e.g., linear) regression model, a decision tree, a random forest, etc. Thus, the event detector may receive the audio event as output from the ML model responsive to using a produced spectrogram based on at least a portion of a received audio stream as input into the MP model.

In some aspects, the event detector 33 may perform one or more audio signal processing operations upon the audio stream. For example, the captured audio stream may include ambient noise (e.g., a signal-to-noise ratio (SNR) that is above a threshold), and as a result, the event detector may produce a clean (less or no noise) signal, which includes one or more sounds. For instance, the detector may apply the audio stream to a noise suppression algorithm, which outputs a clean audio signal (stream) with little (e.g., below a SNR threshold) to no noise. As another example, the detector may apply one or more audio filters (e.g., a low-pass filter, etc.) to the audio stream (e.g., when the audio stream has wind noise (e.g., low-frequency noise), the detector may apply a high-pass filter).

In one aspect, sounds captured by the microphone may at least partially overlap one another (e.g., which may result in at least two sounds occurring at approximately the same time). In which case, the event detector may be configured to extract both sounds and determine which (either or both) of the sounds may be used to detect an audio event. For example, when two sounds occur, one sound may at least partially mask another sound. In which case, the event detector may determine that the masking sound be used, as opposed to the masked sound. To make this determination, the event detector may identify one or more sounds within the received audio stream. To do this, the event detector may perform a spectral analysis, such as blind source separation (BSS) upon the audio stream to identify one or more sound sources (e.g., as one or more audio signals) within the audio stream. The event detector may determine which of the sources to use based on one or more criteria. For instance, the detector may use the sound source with a lower (e.g., below a threshold) SNR. In another aspect, the detector may use a sound source that has a consistent (e.g., staying above a threshold) signal level (e.g., whether a sound fades in the background, which may be the case when a sound source is moving away from the microphone).

In another aspect, the event detector may determine which of one or more spectrograms to use to determine whether an audio event has occurred. For instance, for one or more sounds identified within the operating room, the event detector may produce at least one spectrogram. In which case, the event detector may choose a spectrogram (from several spectrograms), for detecting whether an audio event associated with the chosen spectrogram has occurred. In one aspect, the event detector may make this choice based on a confidence score produced for each spectrogram. In some aspects, the confidence score may be determined based on a spectral comparison between spectrograms (e.g., based on whether at least one frequency bin within one or more spectrograms has a magnitude above a threshold).

In some aspects, the event detector may detect multiple (one or more) events, and may determine which of the multiple detected events are used to optimize the surgical data streams (e.g., to time-synchronize the streams). For instance, the event detector may produce two separate spectrograms (e.g., a first spectrogram associated with a first portion of the audio stream and a second spectrogram associated with a second portion of the audio stream), and may use the spectrograms to detect separate audio events. As an example, the event detector may detect an audio event of a heart monitor beeping, and another audio event of an energy device being used by an operator during a surgical procedure. The event detector may determine which of the audio events to use based on a confidence score. Specifically, the event detector may determine a first confidence score for the first audio event and a second confidence score for the second audio event. In one aspect, a confidence score may be based on one or more characteristics of the audio events. For instance, a confidence score may be based on what type of audio event is detected, such as whether the event is a unique sound (e.g., a sound of a particular energy device), or whether the sound is an ambient background sound (e.g., a door closing, wind noise, etc.). In this case, the more the unique the audio event is, the higher the confidence score may be. In another aspect, the confidence score may be a running average across a period of time. For example, the event detector may determine that the sound is consistently present within the operating room, and therefore can be used to time-synchronize the streams with a higher level of accuracy. In one aspect, the audio event with the higher confidence score (e.g., over a period of time) may be used to time synchronize streams, as described herein. Returning to the previous example, the event detector may use the first audio event to time synchronize streams (e.g., to produce a timestamp) instead of the second audio event based on the first confidence score being greater than the second confidence score.

As described thus far, the (event detector 33) may be configured to detect events, such as audio events based on an analysis of one or more data streams. In another aspect, the event detector may be able to detect other types of events. For example, the event detector may be configured to detect an image event, based on an image analysis of one or more images (or image data) of one or more video streams captured by one or more cameras 23 of the surgical system. For example, the event detector may perform an object recognition algorithm upon a video stream to detect an object captured within a field of view of the camera 23. In one aspect, the object recognition algorithm may analyze the video stream to detect characteristics of an object, such as geometric shapes, color, etc. Once identified, the algorithm may apply the characteristics to a model that produces an identification of an image event as output. In another aspect, the detector may perform a table lookup into a data structure that associates image characteristics with an image event. As a result, once one or more matching characteristics are identified, the detector may select an associated image event from the table. Thus, in one example, when the electronic device 29a is a heart monitor that is displaying a visual representation of a user's heartbeat and the field of view of the camera 23 includes the display screen of the device 29a, as shown in this figure, the event detector 33 may detect an image event as the visual representation of the heartbeat shown on the device 29a.

In one aspect, image events may be based on a detection of objects within an operating room, such as medical equipment, a clock, etc. In another aspect, image events may be based on a detection of objects that are known to reoccurring within an operating room. Objects that periodically (and continuously) reoccur may be used to perform operations, such as time-synchronization operations. Examples may include lights (e.g., LEDs) that periodically flash on surgical equipment (to provide visual information and/or warnings to operators), images or graphical objects that are displayed on displays, etc. In some aspects, detectable objects may not be viewable by operators. For instance, the surgical system may include one or more infrared emitters that emit an infrared signal. Such a signal may be detected by an infrared detector (not shown) of the surgical device, which the event detector 33 may use to detect an image event.

As described herein, the event detector may use confidence scores between detected events in order to determine whether event is used to perform one or more operations, such as time-synchronization. In one aspect, the event detector may be configured to use surgical data from one or more surgical devices to validate a confidence score (which may thereby increase the confidence score). In particular, the controller 30 may be configured to validate that a particular audio event is occurring, which may then be used to perform one or more operations. For example, the event detector may detect an audio event of a surgical device outputting a sound, such as beeping sounds of a heart monitor. The event detector may be configured to determine whether an image event of a visual representation of the beeping sounds is occurring (e.g., contemporaneously with the beeping sounds) by monitoring a video stream captured by the camera 23. If so, the event detector may apply a higher confidence score to the audio event of the beeping sounds, and may use such an event to time-synchronize surgical data streams, as opposed to using another detected audio event (e.g., of a door closing), which may have a lower confidence score (e.g., since the event detector may not be able to validate that sound).

In one aspect, the ML model may be trained using a set of (e.g., predefined) training data, which may be derived in a controlled environment (e.g., laboratory). In particular, the training data may be created based on one or more audio (target) signals that are emitted by one or more (e.g., medical) electronic devices (e.g., during operation while use in a surgical procedure). For example, the audio signal (which may not vary over time) may be used by the medical device to convey surgical information and/or warning sounds (e.g., beeping noises of a heart monitor). In some aspects, the training data may include (e.g., spectrograms of) the audio signals that include known sounds (e.g., that occur within an operating room), and an indication of what the sounds are, and the data may be used (e.g., through supervised learning) to train the model.

In one aspect, the one or more target signals may be processed to enhance performance of the trained ML model. For example, signals may be modified (augmented) through various signal processing operations, such as adding noise (e.g., white noise, pink noise, brown noise, etc.), adding realistic ambient background noise from a surgical operating room, applying various signal-to-noise (SNR) ratios, adjusting signal levels (sound output level) by applying one or more scalar gains, applying one or more audio filters (e.g., low-pass filter, high-pass filter, etc.) to mimic acoustic room characteristics that could occur during an audio recording (e.g., while the microphone 32 captures sounds of) an operating room. In one aspect, different signal processing operations may be performed upon one target signal (e.g., sound of a heart monitor), to produce one or more versions of that signal, each version being a (e.g., slightly) different variation of the original signal. As a result, the training data can be expanded in a realistic manner (e.g., such that the sounds of the target signals are as if they were captured within an operating room, during a surgical procedure) in order to improve real-world application of the trained model. In one aspect, the training data may include (or may be derived from) the one or more audio target signals (e.g., as one or more audio files) have a same (or similar) track length (e.g., one or more seconds), ensuring that the targeted sound is fully contained from the start of the track to the end of the track.

In one aspect, the ML model may be pre-trained, such as by an electronic device that is remote to the surgical system 101 (e.g., by a cloud-based server). In another aspect, the ML model may be trained by one or more electronic devices (e.g., the hub 20) of the surgical system 101.

The clock 35 may be an internal clock of (e.g., a clock based on an electronic oscillator circuit integrated within the controller 30 of) the (e.g., hub 20 shown in FIG. 2 of the) surgical system 101 that is configured to produce a clock signal (data), which the controller 30 uses to perform timely signal processing operations. In one aspect, the clock 35 may be defined by the controller based on clock data retrieved from an external source, such as being based on an atomic time provided by a GPS satellite network). In another aspect, the clock may be defined according to timing messages received from one or more other devices, such as being set based on time data received from a Network Time Protocol (NTP) server.

The timestamp generator 36 generates (or produces) a timestamp based on a detected event by the event detector 33 and based on the internal clock 35 (of the controller 30). In particular, the generator may receive time data from the clock 35 and receive an indication from the event detector 33 that an event, such as an audio event, has been detected, and produce a timestamp, in response. For example, upon determining that an audio event has occurred, such as a beep from a heart monitor, the timestamp generator may produce a timestamp. In one aspect, the timestamp may be a time at which the audio event is detected by the surgical system. In another aspect, the timestamp may indicate a time associated with the clock 35 at which the audio event is captured by the surgical system. For example, the time may be a time at which the microphone 32 captured the sound of the audio event from within the ambient environment. This determination may be based on the spectral analysis performed by the event detector. For instance, as described herein, the event detector may detect audio events based on spectrograms that are produced using one or more audio samples of the audio stream. In this case, the timestamp produced by the generator may be associated (or correspond) to a time of the one or more audio samples (e.g., a time at which the audio samples are received from the microphone). Thus, a timestamp may indicate a moment in time along an internal clock 35 at which an audio event within an audio stream is received by the (e.g., controller 30 of the) surgical system 101.

The time synchronizer 37 receives the audio stream (produced by the microphone 32), the video stream (produced by the camera 23), and/or the N surgical data streams from the one or more surgical devices and/or sensors 28. The synchronizer receives the timestamp produced by the generator 36 and uses the timestamp to synchronize at least some of the received data streams. In particular, the synchronizer tags the timestamp (e.g., by adding the timestamp to metadata) to the N surgical data streams, the audio stream, and the video stream. In one aspect, the synchronizer may add the timestamp to a portion of each of the data streams that is associated with the time indicated by the timestamp. For example, if the timestamp is a time, such as 00:00:00, the synchronizer may add the timestamp to portions of a data stream (e.g., one or more samples of the audio stream) that is received by the surgical system at 00:00:00. In another aspect, the portions to which the timestamp are tagged may not be received at a time of the timestamp. As a result, the time synchronizer 37 may produce synchronized streams, which the controller 30 stores in memory 38.

In one aspect, in addition to (or in lieu of) storing the synchronized data streams, the controller 30 may present at least some of the surgical data through one or more output devices. For example, the controller may produce one or more video streams, each having at least some surgical data from one or more synchronized streams, and may display the produced video streams on the display 24. As another example, the controller may produce one or more audio streams, each stream including at least some surgical data for driving the speaker 31. In another aspect, the controller may "pass through" at least some of the data streams to the output device(s). For instance, the controller may display the synchronized video stream produced by camera 23 on the display 24. Thus, the controller may time-synchronize data streams, while displaying at least some of the surgical data received within the streams (e.g., during a surgical procedure).

As described thus far, the surgical system is able to detect events that occur within an operating room by analyzing one or more data streams, which may include surgical data associated with the operating room, such as an audio stream produced by the microphone 32 within the room. Such events may occur naturally within the operating room, such as being associated with mechanical sounds (e.g., actuator sounds while robotic arms move), or being associated with natural sounds, such as a sound of a door opening or closing. In one aspect, events may be the result of an affirmative action by the surgical system, such that a stimulus is produced by the system such that the stimulus is captured by one or more surgical data streams and is used as a detected event. In some aspects, the surgical system may include one or more output electronic devices, which may be configured by the system to produce an output that may be captured by the system (e.g., an image captured by the camera 23, a sound captured by the microphone 32, etc.). For example, the system may be communicatively coupled with a light emitting diode (LED), which may be a part of a surgical device 28. The system may transmit a control signal to the LED, such that it emits an optical signal, which may be captured by the camera 23, and used by the controller 30 to detect an image event. Such an event may be used to time-synchronize the surgical data streams, as described herein. As a result, the system may periodically cause the LED to produce the optical signal, such that new (updated) timestamps based on newly detected image events are continuously added to the surgical data streams in order to time-synchronize the streams over a period of time.

In one aspect, the surgical system may use event detection for time-synchronizing surgical data streams. In another aspect, the surgical system may perform other operations based on event detection. For example, the surgical system may use event detection to ensure that the hub 20 is in proper communication with surgical devices (e.g., during a procedure). As described herein, the hub may communicate with various devices in order to receive surgical data and/or to provide one or more commands, during a procedure. In some instances, communication between the hub and a device may be interrupted (e.g., the device being inadvertently unplugged, when both devices are connected via a wire). In which case, the surgical system may use event detection to confirm that a device and the hub are exchanging data. For example, the controller 30 may provide a control signal to a device to emit a sound, and the controller may determine whether an audio event occurs in which a speaker of the device produces the sound. If an audio event does not occur (e.g., within a period of time), the controller may present a notification (e.g., displaying a pop-up notification on the display 24), indicating that communication has been lost with the device.

In another aspect, event detection may be used to track progress of a surgical procedure, and to output a notification based on the progress. For example, the controller 30 may be configured to determine a surgical procedure of which surgical data is being received through one or more surgical data streams by the controller (e.g., based on user input, or based on the surgical data), and may be configured to determine whether a detected event corresponds to the surgical procedure. For instance, upon detecting a particular event (e.g., an audio event indicating that an operator is using an ultrasonic instrument), the controller may determine whether the surgical procedure requires the use of such an instrument and/or whether use of the instrument is to occur within a predefined schedule of the procedure. If not, the controller may be configured to output a notification indicating that an event has been detected that does not correspond with the surgical procedure.

FIGS. 4-7 are flowchart of processes for aspects of performing one or more digital signal operations (e.g., time-synchronization) upon one or more surgical data streams that include surgical data (e.g., captured from within an operating room during a surgical procedure) based on event detection. In one aspect, at least some of the operations may be performed in real-time, such as detecting audio events during a surgical procedure within an operating room using an audio stream captured by a microphone within the room. In another aspect, at least some of the operations may be performed postoperatively (e.g., based on audio and/or video captured during a surgical procedure, but after the procedure has been performed). In some aspects, at least some of the operations of at least some of the processes described herein may be performed by (e.g., the controller 30) of (e.g., the hub 20 of) the surgical system 101, described herein.

Figure 4:
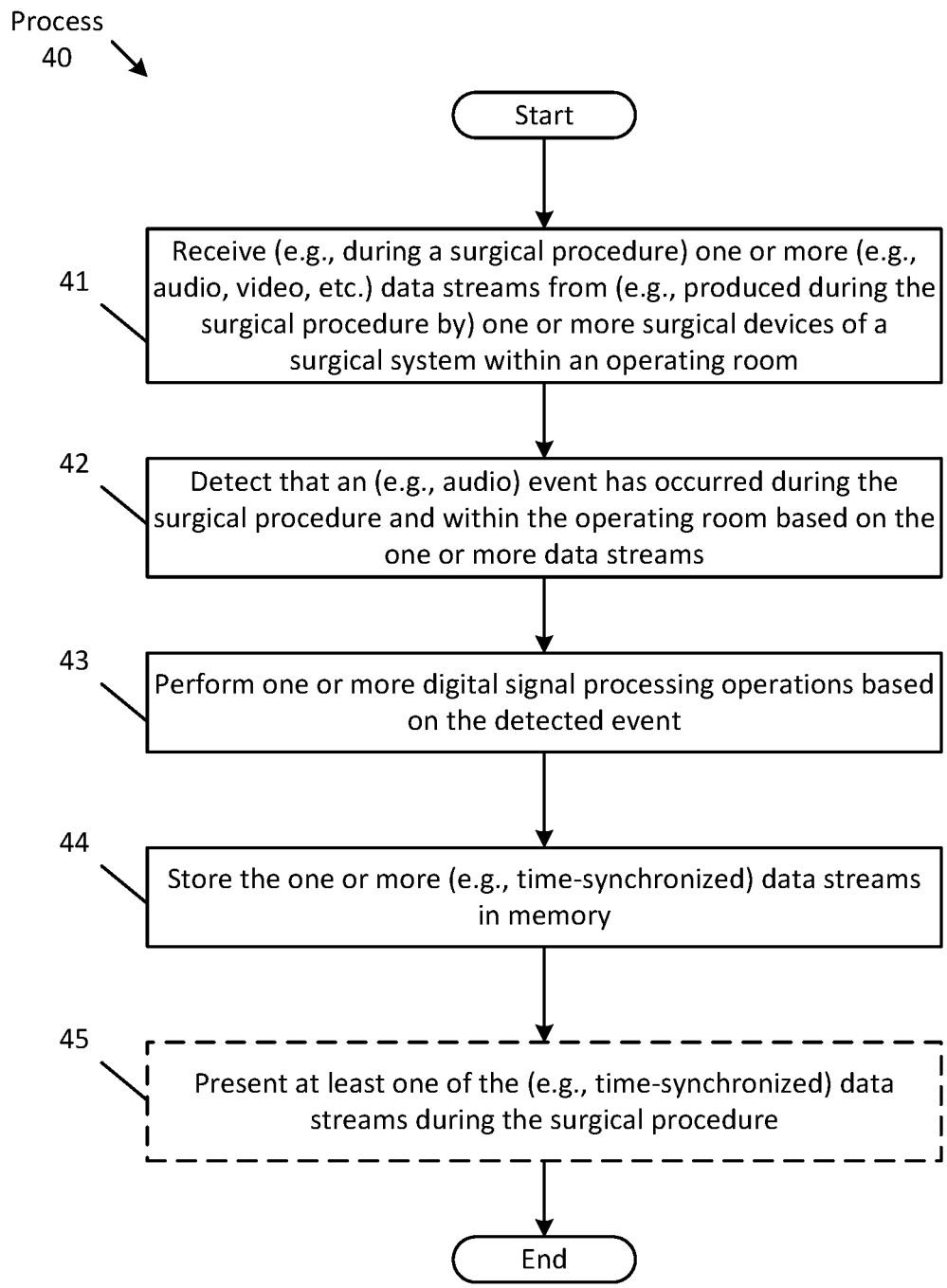
FIG. 4 is a flowchart of a process for an aspect of time synchronizing surgical data streams using detected events within an operating room.

Turning to FIG. 4, this figure is a flowchart of a process 40 for an aspect of time synchronizing surgical data streams using detected events within an operating room. The process 40 begins by the controller 30 receiving (e.g., during a surgical procedure) one or more (e.g., audio, video, etc.) data streams from (e.g., produced during the surgical procedure by) one or more surgical devices of the surgical system within an operating room (at block 41). In one aspect, at least one of the data streams may include an audio stream. For example, the data streams may be received from one or more (e.g., surgical devices and/or sensors 28 of FIG. 3, one or more microphones 32, and/or one or more cameras 23. In one aspect, data streams may be received once the device is activated (or powered on). In another aspect, devices may provide data streams based on user input (e.g., which may be received through an input device that is communicatively coupled to the devices).

The controller 30 detects that an (e.g., audio) event has occurred during the surgical procedure and within the operating room based on one or more data streams (at block 42). For example, the controller 30 may perform an acoustic analysis of one or more audio streams to detect an audio event detected by one or more microphones of the system. The controller performs one or more digital signal operations based on the detected event (at block 43). For example, the controller may time-synchronize one or more data streams based on a detected event, such as a detected audio event. More about time-synchronizing streams based on a detected audio event is described herein.

In another aspect, the controller may perform a classification operation to classify data within one or more data streams based on a detected event. For example, upon detecting an audio event, such as a sound of a door closing, the controller may add a classifier (e.g., as metadata) into one or more data streams (e.g., an associated audio stream), in order to classify the sound. As another example, when the controller detects an object within a video stream (e.g., a blinking LED of a surgical device), the controller may add an object classifier to the video stream. In which case, the controller may add the classifier as metadata and/or may add a visual representation of the classifier. For example, the controller may overlay a visual representation of the object onto one or more video streams in which the object is identified. In another aspect, the controller may modify one or more data streams based on a detected event. For example, upon detecting speech within an audio stream, the controller may perform one or more audio signal processing operations upon the stream. As an example, the controller may apply one or more audio operations in order to mask (or remove) the speech from the audio stream (e.g., by applying one or more audio filters). Alternatively, the controller may perform one or more audio signal processing operations to enhance sounds of one or more audio events, such as enhancing sounds of a particular surgical device, such that a user may monitor the device during a postoperative review of a surgical procedure.

In another aspect, the controller may derive one or more statistics relating to surgical data of the data streams based on the event detection. For example, the controller may detect when an energy surgical device has been activated by detecting sounds caused by the device while active, and may output statistics relating to the activation of the device. For instance, the controller may output a duration during which the device was active. As another example, the controller may indicate periods of time during which the device is active and/or may indicate an average duration during which the device is active (e.g., across a duration of a surgical procedure). In other aspects, the controller may be configured to derive other statistics. In some aspects, the controller may add statistics to one or more data streams, as metadata. In another aspect, the controller may overlay at least some statistics on top of one or more video streams, such that a user may view the statistics along with video content within the stream.

The controller 30 stores the one or more data streams in memory 38 (at block 44). For example, as described herein, the controller may perform time-synchronizing operations upon one or more data streams, based on the detected events. Once synchronized, the controller may store the streams in memory (e.g., for later review by a user). In one embodiment, the stored streams may include at least some metadata determined by the controller 30, such as classifiers and/or statistics. The controller may optionally present at least one of the (e.g., time-synchronized) data streams during the surgical procedure (at block 45). As described herein, at least some of these operations may be performed during a surgical procedure. Thus, to present the streams, the controller may display one or more of the data streams on one or more displays 24.

Figure 5:
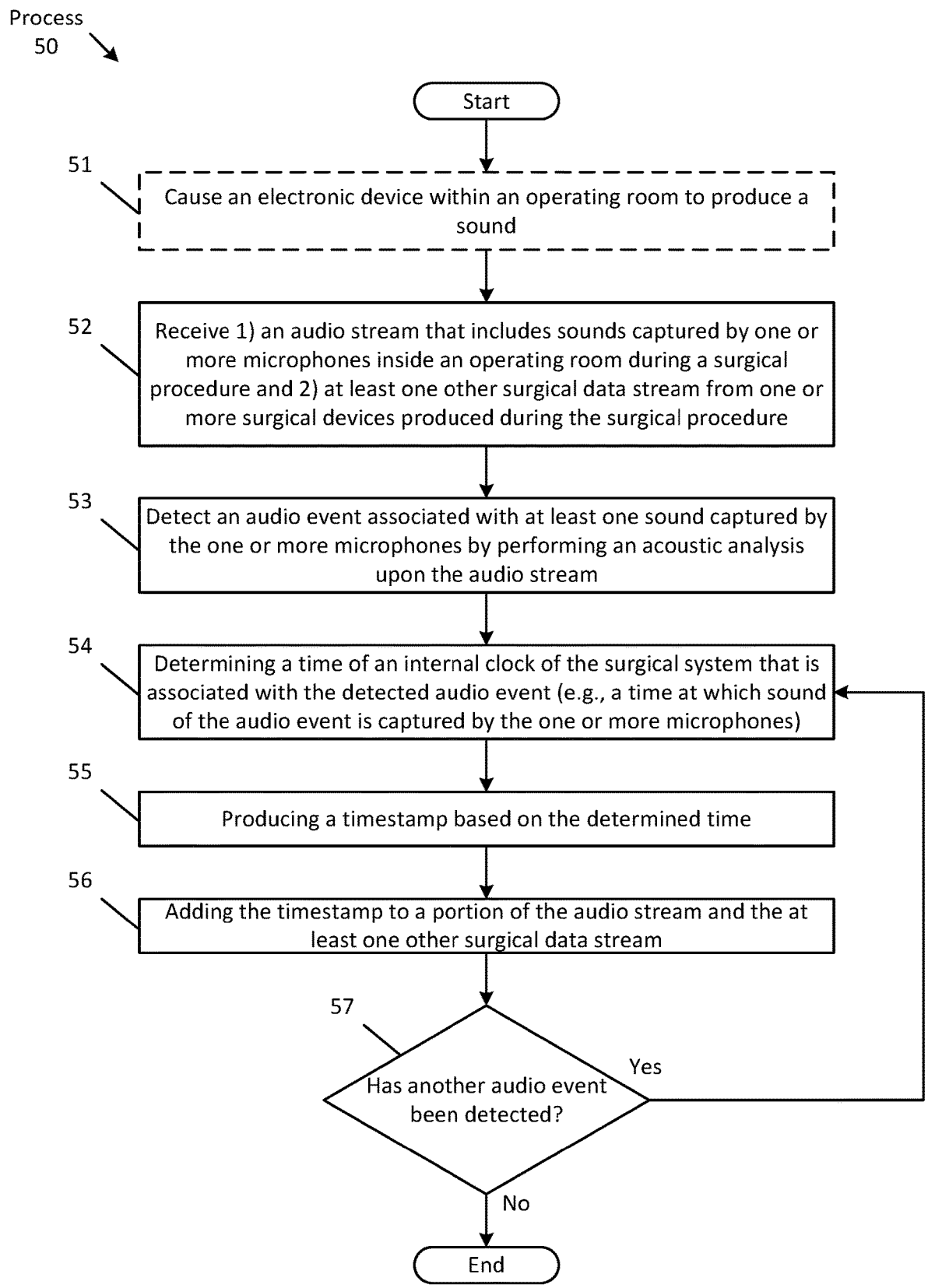
FIG. 5 is a flowchart of a process for an aspect of detecting an audio event that occurs within an operating room for performing synchronization.

FIG. 5 is a flowchart of a process 50 for an aspect of detecting an audio event that occurs within an operating room for performing time synchronization. In one aspect, at least some of the operations in this process may be performed by the controller 30 at blocks 42 and 43 of process 40 in FIG. 4. The process 50 begins by the controller 30 causes an electronic device within the operating room to produce a sound (at block 51). For instance, the controller may cause an electronic device, such as device 29*b* in FIG. 3 to produce a sound, which may be used by the surgical system to time-synchronize one or more data streams, as described herein. In some aspects, this operation may be optional. In which case, the sound produced within the operating room may be a naturally occurring or a mechanical sound, as described herein.

The controller 30 receives 1) an audio stream that includes sounds captured by one or more microphones inside the operating room during a surgical procedure and 2) at least one other surgical data stream from one or more surgical devices produced during the surgical procedure (at block 52). In particular, at least one surgical data stream may be received from a surgical device and/or a sensor 28, shown in FIG. 3, in real-time and/or at least one stream may be retrieved from memory 38 (e.g., after a surgical procedure has been completed). When the stream is retrieved from memory, the surgical data contained within the stream may have been received (or captured) during a previously conducted surgical procedure. In one aspect, a surgical data stream may be a video stream received from a camera, such as camera 23 of the surgical system, which may be positioned within the operating room.

The controller 30 detects an audio event associated with at least one sound captured by the one or more microphones by performing an acoustic analysis upon the audio stream (at block 53). As described herein, the controller may produce a spectrogram based on the audio stream. In particular, the spectrogram may spectrally represent one or more sounds contained within the audio stream. To detect the event, the controller may apply the spectrogram to a ML model as input, which is configured to classify the spectrogram as an audio event (e.g., identifying the sound represented by the spectrogram), as output. For instance, the controller may receive (or retrieve) a ML model (e.g., from memory) trained using training data that associates audio events that have occurred within an operating room with respective spectrograms, and may receive (or determine) the audio event as output from the ML model responsive to using the produced spectrogram as input into the ML model.

The controller determines a time of an internal clock of the surgical system that is associated with the detected audio event (at block 54). For example, the controller may determine a time of an internal clock at which sound of the audio event is captured by the one or more microphones (e.g., received by the controller 30). In particular, the time may be determined based on the acoustic analysis of the audio stream. For instance, the controller 30 may perform an acoustic analysis upon an audio stream to detect an audio event that has occurred within the operating room, and may determine the time as a moment at which the audio event occurred (based on the internal clock). In another aspect, the time may be based on when the sound is produced. As described herein, the controller may cause an electronic device (e.g., device 29*b* in FIG. 3) to produce a sound, which the controller uses as the audio event. In which case, the determined time of the internal clock may be a time at which the electronic device produces the sound (e.g., the controller instructs the electronic device by transmitting one or more control signals to produce the sound).

The controller 30 produces a timestamp based on the determined time (at block 55). Specifically, the timestamp may be of the determined time according to the internal clock. In one aspect, the timestamp may include the determined time, which may be a time value (e.g., 00:00:00) and/or a date (e.g., Jan. 1, 2000). In some aspects, the timestamp may follow (or be in compliance with) the International Organization for Standardization (ISO) 8601 standard. The controller 30 adds the timestamp to a portion of the audio stream and the at least one other surgical data stream (at block 56). In particular, the timestamp is added such that (at least) a portion of each of the data streams may be time-aligned with a corresponding portion of the audio stream associated with the determined time. For example, the controller may add the timestamp to one or more audio frames that are captured by the one or more microphones at the time associated with the timestamp. In addition, the controller may add the timestamp to the surgical data streams (e.g., as metadata) to portions of the streams that are received at the time of the timestamp. Thus, the timestamp may be added as metadata. In another aspect, the timestamp may be added by overlaying the time value and/or date on top of one or more streams. For example, when the streams include a video stream, the controller may superimpose the timestamp on top of the video stream (e.g., using alpha blending). In another aspect, the timestamp may be added to one or more video streams produced by the controller (each stream having at least some surgical data from one or more surgical streams, as described herein).

The controller determines whether there is another audio event that has been detected (at decision block 57). For instance, the controller may perform at least some of the operations described herein to (continue to) monitor one or more audio streams, as they are being received by the surgical system. In one aspect, the controller continues to determine whether any additional audio events, which are similar (or the same) as previously detected audio events have occurred. In which case, the controller may use a known (e.g., periodically and constantly) detected audio event (e.g., a beeping sound of a heart monitor) as a clock, from which timestamps are produced. In another aspect, the surgical system may use other (or different) detected audio events to produce additional (or future) timestamps, such as using detected sounds of a heart monitor and/or naturally occurring sounds within the operating room (e.g., closing of a door).

As described in this process 50, the controller 30 time-synchronizes one or more streams using (adding) timestamps that are produced based on one (or more) clock(s) of the surgical system. In another aspect, at least some streams may be synchronized based on time information within one or more of the streams. As described herein, at least some of the received surgical data streams may include time information added by their respective devices (based on different internal clocks). In which case, the controller may be configured to use time information of one of the streams to synchronize other streams. For example, when the audio stream includes time information, upon detecting an audio event, the controller may be configured to produce a timestamp using a time associated with time information of the audio stream (e.g., a time at which the audio event is included within the stream).

Figure 6:
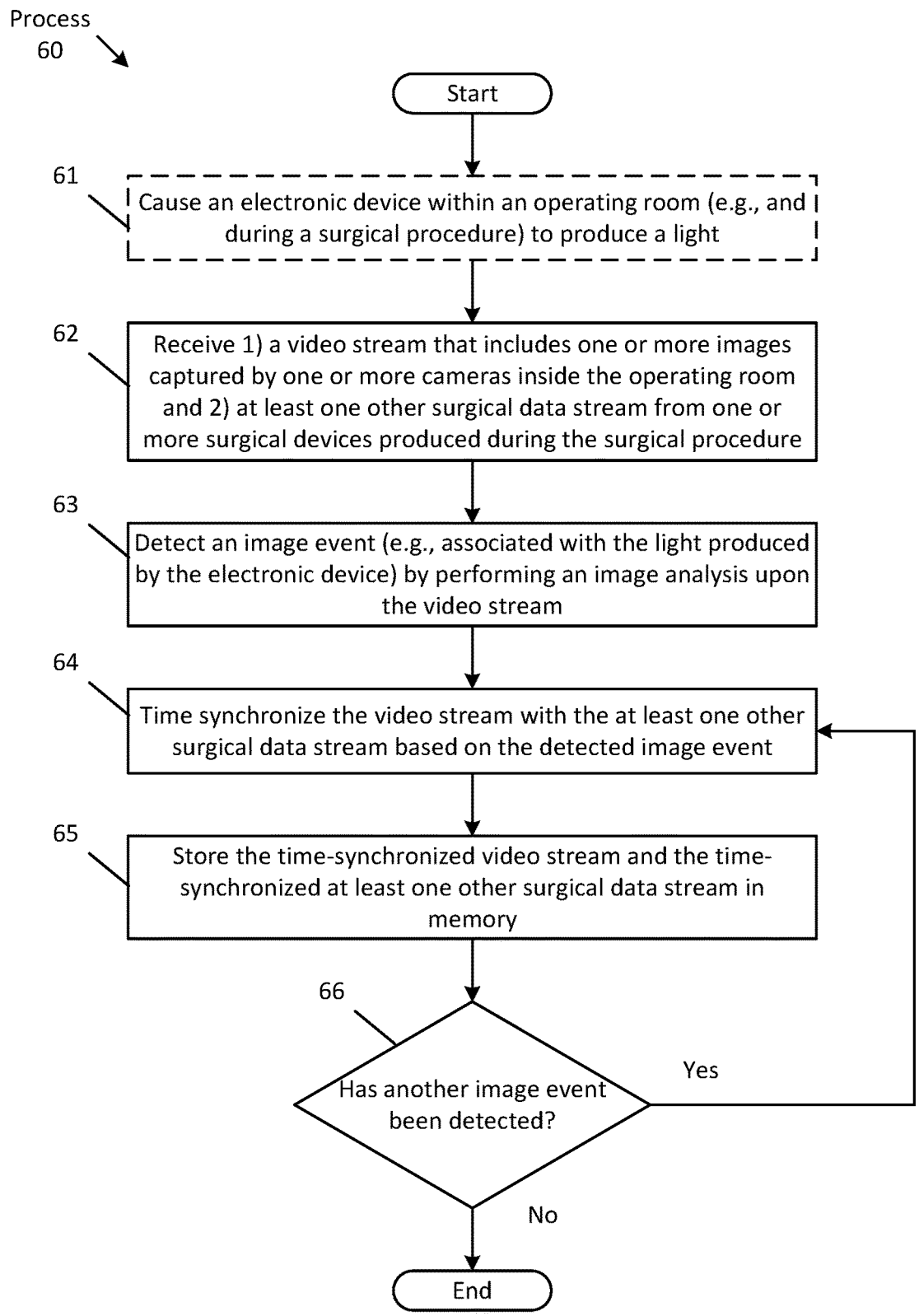
FIG. 6 is a flowchart of a process for an aspect of detecting an image event that occurs within an operating room for performing synchronization.

FIG. 6 is a flowchart of a process 60 for an aspect of detecting an image event that occurs within an operating room for performing synchronization operations. The process 60 begins by the controller 30 causing an electronic device within an operating room (e.g., and during a surgical procedure) to produce a light (at block 61). In particular, the controller may transmit a control signal to at least one electronic device, such that the device outputs an optical signal, which the controller may use to time-synchronize data streams. For example, the controller 30 may transmit a control signal to an electronic device in order to cause a LED of the device to blink. In another aspect, the controller may transmit a control signal to a device with a display, such that the display displays one or more (objects within one or more) images. As an example, the controller 30 may transmit a signal to the electronic device 29a of FIG. 3, in order to display a visual representation of a heartbeat, as shown.

The controller 30 receives 1) a video stream that includes one or more images captured by one or more cameras inside the operating room and 2) at least one other surgical data stream from one or more surgical devices (and/or sensors) produced during the surgical procedure (at block 62). The controller detects an image (or pixel) event (e.g., associated with the light produced by the electronic device, as described herein) by performing an image analysis upon the video stream (at block 63). As described herein, the controller may perform an object recognition algorithm upon at least a portion of the video stream to detect one or more objects contained therein, with which the controller may use to detect an image event.

The controller time synchronizes the video stream with the at least one other surgical data stream based on the detected image event (at block 64). For example, the controller may determine a time based on an internal clock of the surgical system at which the image event is detected, produce a timestamp based on the determined time, and then add the time stamp to one or more streams, as described herein. The controller stores the time-synchronized video stream and the time-synchronized at least one other surgical data stream in memory (at block 65). The controller determines whether there is another image event that has been detected (at decision block 66). If so, the controller returns to block 64 to time-synchronize one or more data streams based on the newly detected image event.

Figure 7:
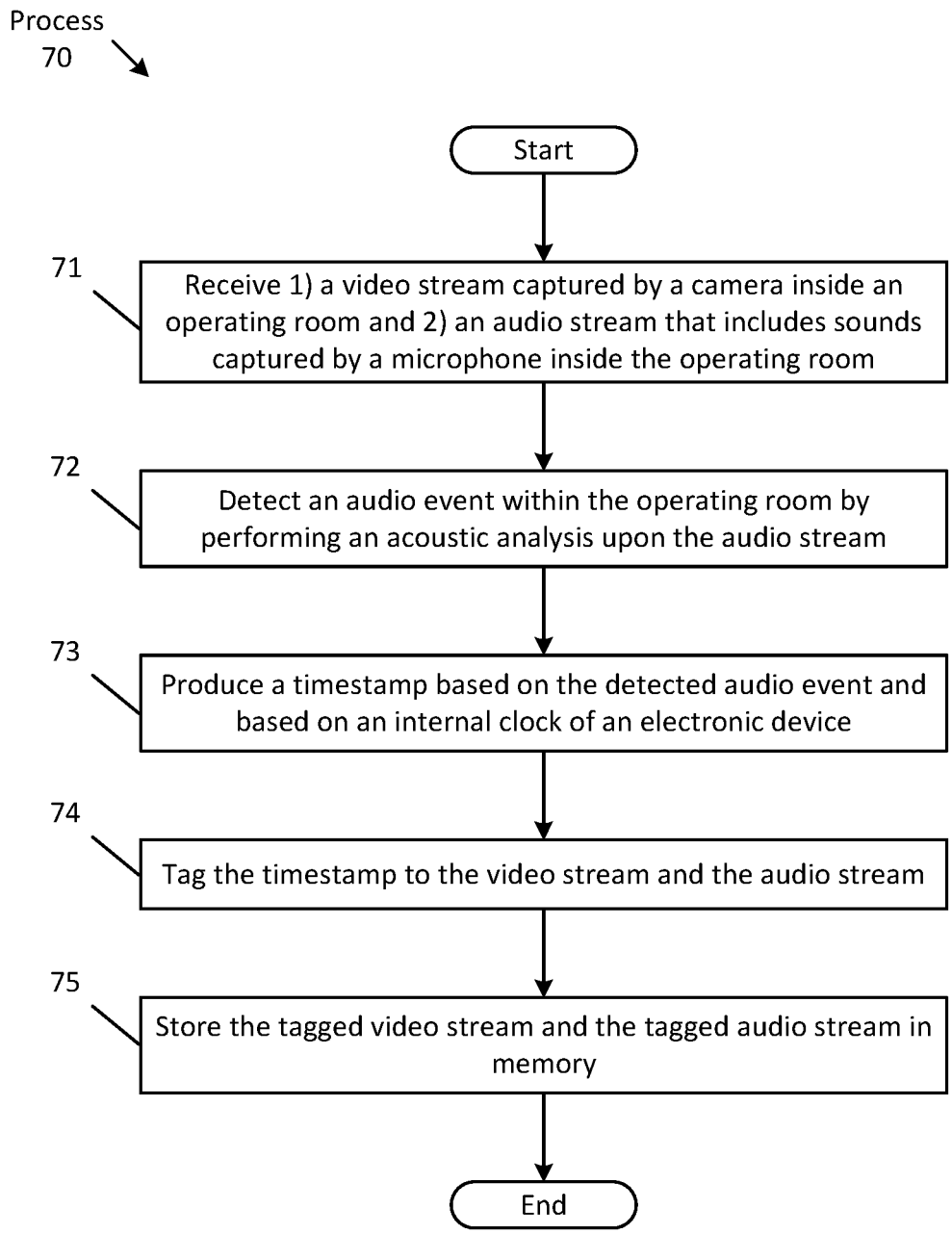
FIG. 7 is a flowchart of a process for another aspect of time synchronizing surgical data streams using a detected audio event.

FIG. 7 is a flowchart of a process 70 for another aspect of time synchronizing surgical data streams using a detected audio event. The controller 30 receives 1) a video stream captured by a camera inside an operating room and 2) an audio stream that includes sounds captured by a microphone inside the operating room (at block 71). The controller detects an audio event within the operating room by performing an acoustic analysis upon the audio stream (at block 72). The controller produces a timestamp based on the detected audio event and based on an internal clock of an electronic device, such as the hub 20 shown in FIG. 2 (at block 73). The controller tags the timestamp to the video stream and the audio stream (at block 74). The controller stores the tagged video stream and the tagged audio stream in memory (at block 75).

Some aspects may perform variations to at least one of the processes 40, 50, 60, and/or 70 described herein. For example, the specific operations of a process may not be performed in the exact order shown and described. The specific operations may not be performed in one continuous series of operations and different specific operations may be performed in different aspects. For example, the operations within dashed boxes may be optional operations that may not be performed while at least a portion of the process 40 is performed. As an example, the process may omit the operations performed in block 45 to present the data streams, which may be the case when the operations are performed after the completion of the surgical procedure.

As described thus far, the surgical system may be configured to detect events, such as audio events (e.g., an identification of a particular sound captured by a microphone within an operating room) and an image (or pixel) event (e.g., an identification of a particular object (or image) captured by a camera within the operating room). Other types of detected events may be used to perform at least some of the operations described herein, such as time synchronization. For example, the surgical system may detect events associated with reception of a particular type of surgical data from a surgical device. In particular, the surgical system may be configured to detect activation events for surgical devices (or tools), such as an energy (ultrasonic) device. In which case, the surgical system may be configured to time synchronize data streams in response to detecting an activation event of an ultrasonic device (e.g., when the device is activated to perform a surgical task upon an object, such as cutting tissue of a patient).

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

As previously explained, an aspect of the disclosure may be a non-transitory machine-readable medium (such as microelectronic memory) having stored thereon instructions, which program one or more data processing components (generically referred to here as a "processor") to (e.g., automatically (e.g., without user intervention)) perform one or more operations (e.g., time-synchronizing one or more surgical data streams) based on detected (e.g., audio) events within an operating room, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B." or "at least of either A or B." In some aspects, this disclosure may include the language, for example. "[element A], [element B], and/or [element C]." This language may refer to either of the elements or any combination thereof. For instance. "A. B. and/or C" may refer to "A." "B." "C." "A and B." "A and C." "B and C." or "A. B. and C."

What is claimed is:

1. A method performed by at least one programmed processor of a surgical system, the method comprising:
receiving 1) a video stream captured by a camera of the surgical system that further comprises a microphone and a surgical device inside an operating room (OR) and 2) an audio stream that includes sounds captured by the microphone inside the OR, wherein the video stream and the audio stream are captured during a surgical procedure within the OR;
detecting an audio event as a sound produced by the surgical device that is being used during the surgical procedure within the OR as output of a machine learning (ML) model by applying input based on at least the audio stream;
producing a timestamp for the detected audio event at a time of an internal clock of the surgical system at which the surgical device produced the sound;
producing time-synchronized data streams by tagging the timestamp to both of the video stream and the audio stream;
using the time-synchronized data streams to train the ML model to detect one or more similar sounds as the sound produced by the surgical device; and
storing the time-synchronized data streams in memory.

2. The method of claim 1 further comprising, producing a spectrogram that represents frequency content of at least a portion of the audio stream, wherein the spectrogram is applied as the input into the ML model to detect the audio event.

3. The method of claim 2, wherein the portion is a first portion of the audio stream, wherein the audio event is a first audio event, and the spectrogram is a first spectrogram, wherein the method further comprises:
producing a second spectrogram of a second portion of the audio stream to detect a second audio event;
determining a first confidence score for the first audio event and a second confidence score for the second audio event; and
using the first spectrogram to be applied to the ML model instead of the second spectrogram based on the first confidence score being greater than the second confidence score.

4. The method of claim 1 further comprising:
detecting an image event within the OR by applying an object recognition algorithm upon the video stream; and
validating the audio event based on the image event occurring contemporaneously with the sound produced by the surgical device.

5. The method of claim 1 further comprising transmitting a control signal to the surgical device to cause the surgical device to produce the sound.

6. The method of claim 1 further comprising performing one or more audio signal processing operations upon the time-synchronized data streams, which are then used to train the ML model, wherein the one or more audio signal processing operations comprises at least one of applying at least one of a noise suppression algorithm, an audio filter, ambient noise, or one or more scalar gains to at least one of the time-synchronized data streams.

7. The method of claim 1 further comprising performing one or more audio signal processing operations upon the time-synchronized data streams to enhance the sound of the surgical device.

8. A method performed by at least one programmed processor of a surgical system, the method comprising:
receiving, during a surgical procedure, a plurality of data streams from a plurality of surgical devices of the surgical system within an operating room (OR) in which the surgical procedure is being performed, wherein the plurality of data streams comprises an audio stream that includes two or more sounds captured within the OR;
detecting, during the surgical procedure, a sound produced by one of the surgical devices that is being used during the surgical procedure as an audio event that has occurred during the surgical procedure by performing an acoustic analysis upon the audio stream;

producing time-synchronized data streams of the plurality of data streams at a time of an internal clock of the surgical system at which the surgical device produced the sound; and performing one or more audio signal processing operations upon the time-synchronized data streams so as to enhance at least one of the sounds captured within the OR during audio playback.

9. The method of claim 8, wherein the audio stream is received from a microphone of the surgical system that is arranged within the OR, wherein producing the time-synchronized data streams comprises:

producing a timestamp based on the time of the internal clock; and adding the timestamp to each of the plurality of data streams such that a portion of each of the plurality of data streams is time-aligned with a portion of the audio stream that includes the sound.

10. The method of claim 8, wherein performing the acoustic analysis comprises:

producing a spectrogram that represents frequency content of at least a portion of the audio stream; and using the spectrogram to detect the sound as the audio event.

11. The method of claim 8, wherein performing one or more audio signal processing operations comprises:

detecting speech within the audio stream; and applying one or more audio filters to the audio stream to remove at least a portion of the speech.

12. The method of claim 8, wherein detecting the sound comprises determining the audio event as output of a machine learning (ML) model responsive to input based on the audio stream.

13. The method of claim 12, wherein the ML model is trained to detect one or more sounds of one or more surgical devices, wherein performing the one or more audio signal processing operations comprises producing one or more audio processed data streams by applying one or more audio filters upon the time-synchronized data streams, wherein the method further comprises using the one or more audio processed data streams to retrain the ML model.

14. The method of claim 8, wherein the at least one of the sounds comprises the sound produced by the one of the surgical devices.

15. A surgical system, comprising:

a microphone, a camera, and a surgical device that are in an operating room (OR);

at least one processor; and memory having stored therein instructions which when executed by the at least one processor causes the surgical system to:

receive 1) a video stream captured by the camera and 2) an audio stream that includes sounds captured by the microphone, wherein the video stream and the audio stream are captured during a surgical procedure within the OR, detect an audio event as a sound produced by the surgical device that is being used during the surgical procedure within the OR as output of a machine learning (ML) model by applying input based on at least the audio stream, produce a timestamp for the detected audio event at a time of an internal clock of the surgical system at which the surgical device produced the sound, produce time-synchronized data streams by tagging the timestamp to both of the video stream and the audio stream, use the time-synchronized data streams to train the ML model to detect one or more similar sounds as the sound produced by the surgical device, and store the time-synchronized data streams in the memory.

16. The surgical system of claim 15, wherein the memory comprises further instructions to produce a spectrogram that represents frequency content of at least a portion of the audio stream, wherein the spectrogram is applied as the input into the ML model to detect the audio event.

17. The surgical system of claim 16, wherein the portion is a first portion of the audio stream, wherein the audio event is a first audio event, and the spectrogram is a first spectrogram, wherein the memory has further instructions to:

produce a second spectrogram of a second portion of the audio stream to detect a second audio event;

determine a first confidence score for the first audio event and a second confidence score for the second audio event; and use the first spectrogram to be applied to the ML model instead of the second spectrogram based on the first confidence score being greater than the second confidence score.

18. The surgical system of claim 15, wherein the memory comprises further instructions to:

detect an image event within the OR by applying an object recognition algorithm upon the video stream; and validating the audio event based on the image event occurring contemporaneously with the sound produced by the surgical device.

19. The surgical system of claim 15, wherein the memory comprises further instructions to transmit a control signal to the surgical device to cause the surgical device to produce the sound.

20. The surgical system of claim 15, wherein the memory comprises further instructions to perform an audio signal processing operation upon the time-synchronized data streams to enhance the sound of the surgical device.

* * * * *